(12) United States Patent
Cho

(10) Patent No.: US 12,267,383 B2
(45) Date of Patent: Apr. 1, 2025

(54) TECHNOLOGY FOR DELIVERING FILE ON LOCAL NETWORK

(71) Applicant: RAKUTEN SYMPHONY, INC., Tokyo (JP)

(72) Inventor: Jiwook Cho, Hwaseong-si (KR)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/248,871

(22) PCT Filed: Jul. 15, 2022

(86) PCT No.: PCT/KR2022/010402
§ 371 (c)(1),
(2) Date: Apr. 13, 2023

(87) PCT Pub. No.: WO2024/014591
PCT Pub. Date: Jan. 18, 2024

(65) Prior Publication Data
US 2024/0372911 A1 Nov. 7, 2024

(51) Int. Cl.
*H04L 67/06* (2022.01)
*H04L 67/1014* (2022.01)
*H04L 45/00* (2022.01)

(52) U.S. Cl.
CPC .......... *H04L 67/06* (2013.01); *H04L 67/1014* (2013.01); *H04L 45/66* (2013.01)

(58) Field of Classification Search
CPC ...... H04L 67/06; H04L 67/1014; H04L 45/66
See application file for complete search history.

(56) References Cited

U.S. PATENT DOCUMENTS

| | | | | |
|---|---|---|---|---|
| 6,981,029 B1* | 12/2005 | Menditto | ............ | H04L 67/1014 709/217 |
| 8,443,056 B2* | 5/2013 | Hunt | .................... | H04L 65/613 709/219 |
| 8,930,538 B2* | 1/2015 | Fullagar | ........... | H04N 21/25891 709/219 |
| 2002/0163882 A1* | 11/2002 | Bornstein | ............... | H04L 45/22 370/227 |
| 2010/0161760 A1* | 6/2010 | Maloo | ................. | H04L 61/4511 709/219 |
| 2012/0072604 A1* | 3/2012 | Stephan | .............. | H04L 67/1001 709/228 |

(Continued)

*Primary Examiner* — Benjamin M Thieu
(74) *Attorney, Agent, or Firm* — HAUPTMAN HAM, LLP

(57) ABSTRACT

The present disclosure proposes a device. The device according to the present disclosure may include a communication circuit, one or more processors, and one or more memories. The communication circuit may communicate with a server and one or more user terminals on a local network. The one or more memories may store files transmitted to the one or more user terminals via the communication circuit. The one or more processors may control the communication circuit so as to receive information indicating a first file from a first terminal among the one or more user terminals and transmit the information to the server, receive path information regarding a device in which the first file is stored from the server and transmit the path information to the first terminal, and transmit the first file to the first terminal via the local network, in response to a request from the first terminal.

18 Claims, 9 Drawing Sheets

(56) References Cited

U.S. PATENT DOCUMENTS

2015/0237159 A1* 8/2015 Lawrence ............. H04L 67/568
709/213
2016/0132522 A1* 5/2016 Lee ........................ H04L 67/06
707/827

* cited by examiner

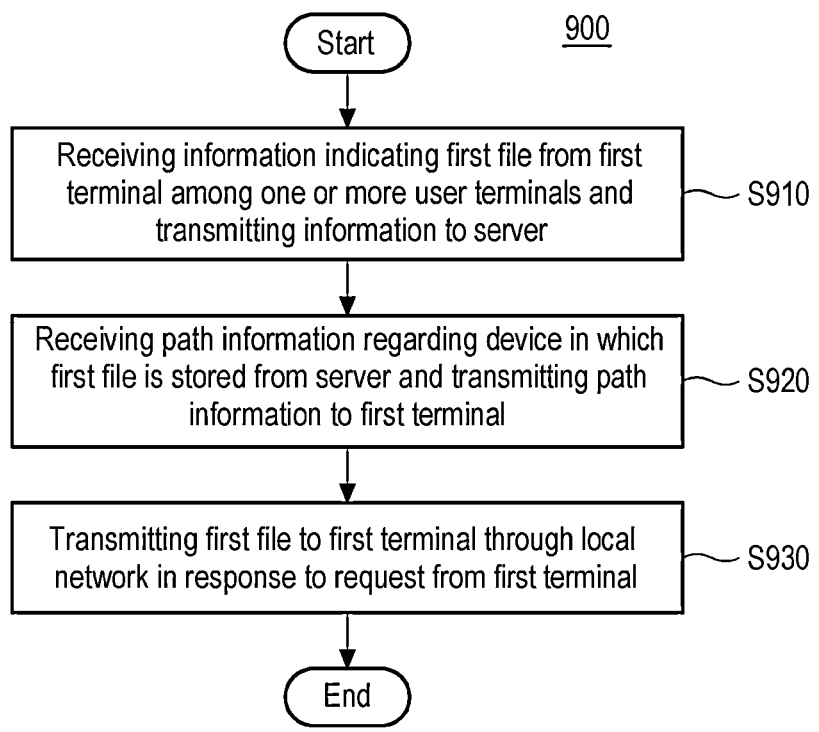

TECHNOLOGY FOR DELIVERING FILE ON LOCAL NETWORK

RELATED APPLICATIONS

The present application is a National Phase of International Application Number PCT/KR2022/010402, filed Jul. 15, 2022.

TECHNICAL FIELD

The present disclosure relates to a technology for transmitting a file on a local network.

BACKGROUND

A contents delivery network (CDN) refers to a system configured to store data related to contents and the like in multiple servers and transmit corresponding data to a user terminal from one of the multiple servers. The server that transmits data to the user terminal among the servers may be located relatively close to the corresponding user terminal.

However, excessive traffic may happen because each of corresponding servers performs data transmission with multiple user terminals. In addition, servers may have limited memories to pre-store data requested by multiple user terminals.

SUMMARY

The present disclosure provides a technology for improving a file transmission rate in connection with transmitting a file to a user terminal on a local network and preventing the occurrence of excessive traffic as a result of file transmission.

As an aspect of the present disclosure, a device may be proposed. The device according to an aspect of the present disclosure may include a communication circuit, one or more processors, and one or more memories. The communication circuit may communicate with a server and one or more user terminals on a local network. The one or more memories may store files transmitted to the one or more user terminals via the communication circuit. The one or more processors, by controlling the communication circuit, may be configured to: receive information indicating a first file from a first terminal among the one or more user terminals and transmit the information to the server, receive path information regarding a device in which the first file is stored from the server and transmit the path information to the first terminal, and transmit the first file to the first terminal via the local network, in response to a request from the first terminal.

As an aspect of the present disclosure, a method may be proposed. The method according to an aspect of the present disclosure may include receiving, by a device configured to communicate with a server and one or more user terminals on a local network, information indicating a first file from a first terminal among the one or more user terminals and transmitting the information to the server, receiving, by the device, path information regarding a device in which the first file is stored from the server and transmitting the path information to the first terminal, and transmitting, by the device, the first file to the first terminal via the local network, in response to a request from the first terminal.

As an aspect of the present disclosure, a non-transitory computer-readable recording medium may be proposed. The computer-readable recording medium according to an aspect of the present disclosure may record a program to be executed on a computer. The program may comprise executable commands, when executed by one or more processors, causing the one or more processors to receive information indicating a first file from a first terminal among one or more user terminals on a local network and transmit the information to a server, receive path information regarding a device in which the first file is stored from the server and transmit the path information to the first terminal, and transmit the first file to the first terminal via the local network, in response to a request from the first terminal.

According to at least one embodiment of the present disclosure, the speed of file transmissions to user terminals may be improved.

According to at least one embodiment of the present disclosure, traffic involved in file transmissions may be reduced.

According to at least one embodiment of the present disclosure, the problem of insufficient server storage space may be solved.

BRIEF DESCRIPTION OF DRAWINGS

FIG. 9 is a flowchart illustrating a method according to an embodiment of the present disclosure.

DETAILED DESCRIPTION

Figure 1:
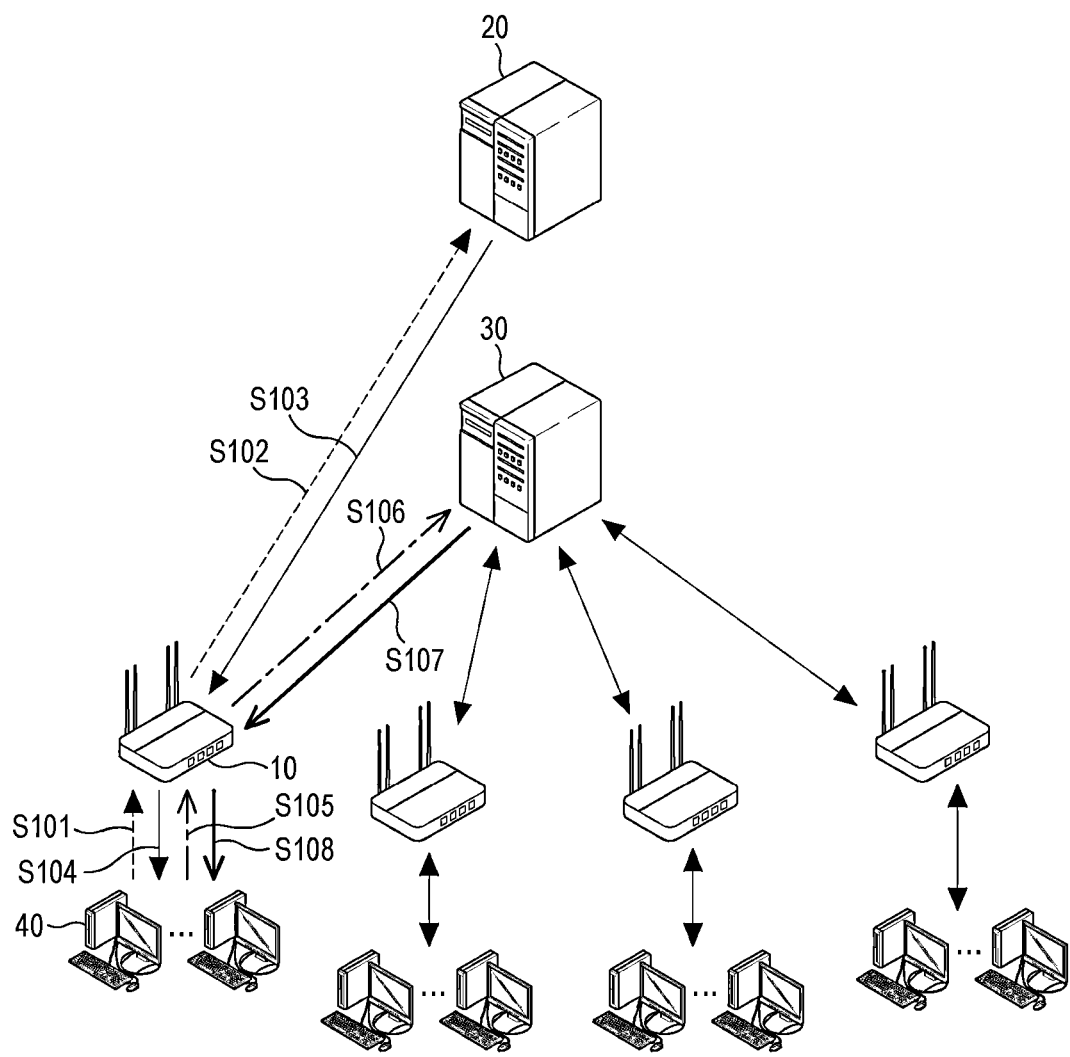
FIG. 1 illustrates a contents delivery network according to an embodiment of the present disclosure.

Various embodiments described herein are examples for clearly explaining the technical sprit of the present disclosure, and are not intended to be limited to specific embodiments. The technical sprit of the present disclosure encompasses various modifications, equivalents, and alternatives of respective embodiments described herein, as well as an embodiment selectively combined from all or part of each embodiment. In addition, the scope of the claims of the technical spirit of the present disclosure is not limited by various embodiments presented below or detailed descriptions thereof.

Terms used herein, including technical or scientific terms, may have meanings that are generally understood by a person having ordinary skill in the art to which the present disclosure pertains, unless otherwise specified.

The expressions "include", "may include", "be provided with", "may be provided with", "have", "may have", and the like used herein mean that a feature (for example, function, operation, element, or the like) that becomes an object exists, and does not exclude the existence of other additional features. That is, such expressions should be understood as open-ended terms connoting the possibility of inclusion of other embodiments.

A singular expression used herein may include meanings of plurality, unless otherwise mentioned, and the same is applied to a singular expression stated in the claims.

The expressions "A, B, and C", "A, B, or C", "A, B, and/or C" or "at least one of A, B, and C", "at least one of A, B, or C", "at least one of A, B, and/or C", "at least one selected from A, B, and C", "at least one selected from A, B, or C", "at least one selected from A, B, and/or C", and the like used herein may denote each enumerated item or all possible combinations of enumerated items. For example, "at least one of A and B" may denote all of the following: (1) A, (2) at least one of A, (3) B, (4) at least one of B, (5) at least one of A and at least one of B, (6) at least one of A and B, (7) at least one of B and A, (8) A and B.

The expression "based on" used herein is used to describe one or more factors that influence a decision, an action of judgment or an operation described in a phrase or sentence including the relevant expression, and this expression does not exclude additional factor influencing the decision, the action of judgment or the operation.

When a certain component (for example, first component) is described herein as "coupled to" or "connected to" another component (for example, second component), this should be understood as having meaning that the certain component may be coupled or connected directly to the other component or that the certain component may be coupled or connected to the other component via a new intervening component (for example, third component).

Hereinafter, various embodiments of the present disclosure will be described with reference to the accompanying drawings. In the accompanying drawings and descriptions with reference to the drawings, identical or substantially equivalent components may be indicated by identical reference numerals. Furthermore, in the following description of various embodiments, repeated descriptions of the identical or relevant components will be omitted. However, even if a description of a component is omitted, such a component is not intended to be excluded in an embodiment.

FIG. 1 illustrates a contents delivery network (CDN) according to an embodiment of the present disclosure. In the CDN according to an embodiment of the present disclosure, a file transmission service may be provided to a user terminal 40 via an origin server 20 and an edge server 30. For example, the user terminal 40 may communicate with the origin server 20 and/or the edge server 30 via a router 10.

The origin server 20 may store at least some of original files. In addition, the origin server 20 may store information regarding the list of files pre-stored by each edge server 30. That is, the origin server 20 may determine an edge server 30 storing a file requested by a user terminal among one or more edge servers 30. In the present disclosure, the description "storing a file" includes caching a file. Caching may refer to storing a low-level set of data having a temporary feature in a high-speed data storage.

The CDN may include one or more edge servers. The one or more edge servers may be arranged to be widely distributed physically at various geographical locations. A file may be transmitted to a user terminal 40 via an edge server 30 that is geographically or physically close to the user terminal 40 among the one or more edge servers. The edge server 30 may receive files from the origin server 20 and may pre-store at least some thereof. Files stored in the edge server 30 may include texts, graphics, scripts, various media files, software, and the like.

The user terminal 40 may transmit information requesting transmission of a specific file to the origin server 20 via the router 10 (S101, S102). The origin server 20 may transmit information indicating an edge server 30 storing the corresponding file to the user terminal 40 via the router 10 (S103, S104). The user terminal 40 may transmit information requesting transmission of the corresponding file to the edge server 30 via the router 10 again (S105, S106), and may receive the corresponding file transmitted from the edge server 30 via the router 10 (S107, S108). In this process, the router 10 may only serve the role of relaying communication between the user terminal 40 and the origin server 20, and between the user terminal 40 and the edge server 30. That is, the router 10 may relay information (for example, request) received from one side to the other side.

In the above embodiment described with reference to FIG. 1, multiple users may request file transmission from the limited number of edge servers 30 included in the CDN. In such a case, a bottleneck in which excessive traffic is concentrated at the edge server 30 may occur. Meanwhile, edge servers 30 included in the CDN receive requests for file transmission from multiple unspecified users, making it difficult to grasp tendencies of users or demands for files. Therefore, the edge servers 30 have limitations in that they cannot appropriately pre-store files requested by multiple users in view of tendencies of multiple users or demands for files.

Figure 2:
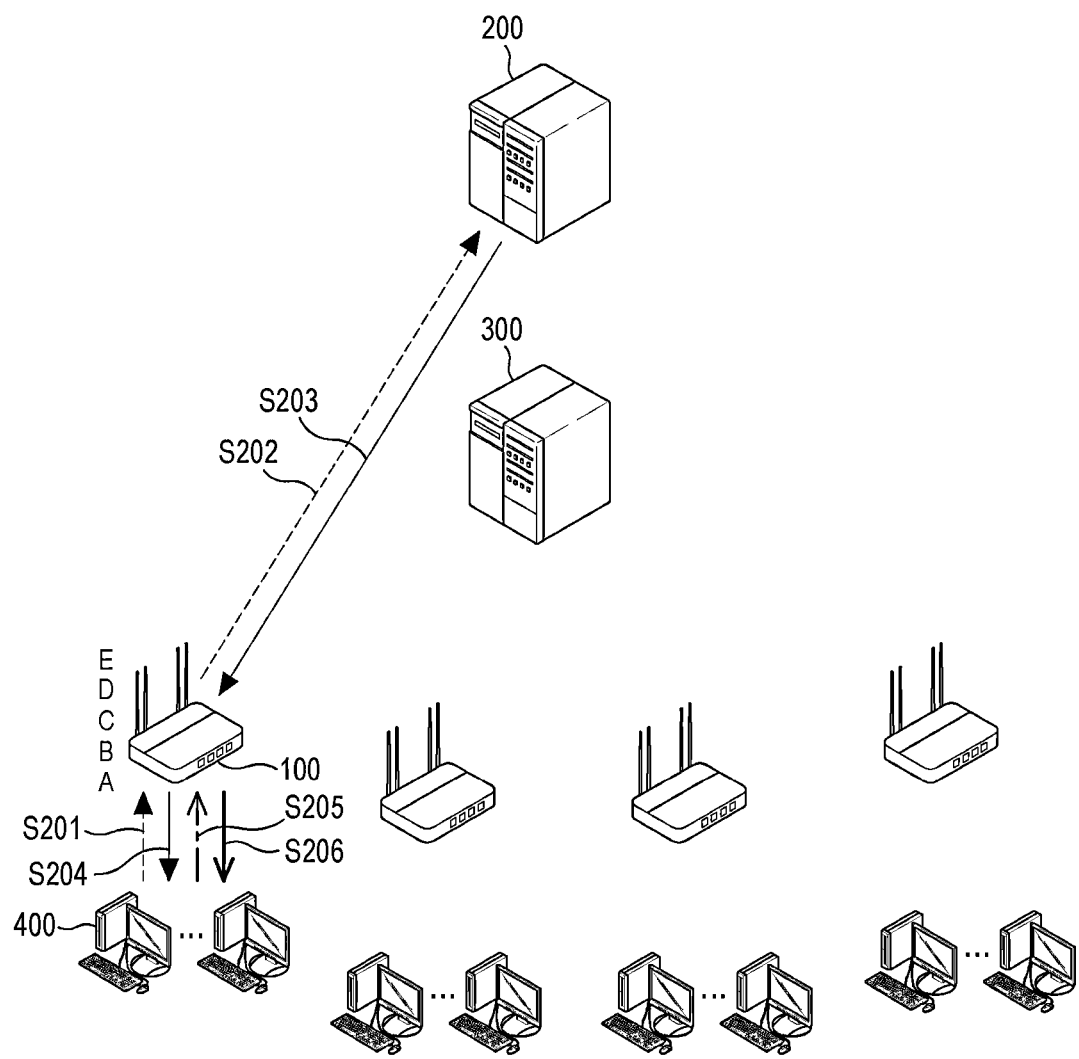
FIG. 2 illustrates a process of operations of a device according to an embodiment of the present disclosure.

FIG. 2 illustrates a process of operations of a device 100 according to an embodiment of the present disclosure. Operations of the device 100 described below may be understood as being performed by a processor 120 of the device 100.

The device 100 may communicate with one or more user terminals 400 via a local network. The local network may refer to a network for establishing communication connection between electronic devices in a limited area within a relatively short distance, such as a house, an office, a school, or other buildings. In an embodiment, the local network may include a Wireless Fidelity (Wi-Fi) or local area network (LAN). The local network may be implemented by the device 100. For example, the local network may be implemented by a device 100 that provides a wireless network (for example, Wi-Fi) or may be implemented by a LAN connected to the device 100. Communication of the device 100 may be performed by a communication circuit 110 described later. The device 100 may access a server 200 via an external wide area network (WAN). The device 100 may communication with external electronic devices other than the server 200 via the external WAN. That is, the device 100 may be configured to connect to one or more user terminals 400 via a local network and to connect to an external WAN.

The server 200 may correspond to the origin server 20 described in the embodiment with reference to FIG. 1. Meanwhile, one or more user terminals 400 may be computers, laptops, portable communication terminals (for example, smartphones), portable multimedia devices, wearable devices, or home appliances. However, the type of one or more user terminals 400 is not limited thereto. Each of the one or more user terminals 400 may include a communication circuit configured to communicate with the device 100, a processor, and a memory configured to store commands that cause the processor to perform calculations.

In an embodiment, the device 100 may serve the role of an access point, a router, or a sharing device. In an embodiment, the memory 130 of the device 100 may store address conversion information. The address conversion information may be information for converting a local network address of one or more user terminals connected to the device 100 via a local network to a network address for communicating with an external network (for example, for accessing a server, etc.). In an embodiment, when a user terminal transmits a request for specific information to the server 200 via the device 100, the device 100 may convert a local network address of the corresponding user terminal to a network address for accessing the server 200, may store the network addresses before and after the conversion in the address conversion information, and may relay the corresponding request to the server 200.

In an embodiment, the device 100 may receive information indicating a request for transmission of a specific file (hereinafter, referred to as a first file) from one user terminal (hereinafter, referred to as a first terminal) among one or more user terminals 400 (S201). The information indicating a request for transmission of a specific file may include information indicating the first file. For example, the information indicating a request for transmission of a specific file may include an identifier of the first file. The device 100 may transmit the information indicating a request for transmission of the first file to the server 200 (S202).

The device 100 may have specific files A, B, C, D, and E pre-stored in the memory 130. In addition, the server 200 may store information regarding files pre-stored by the device 100 and one or more other edge servers, respectively. That is, the server 200 may determine a device in which the first file is stored, among the device 100 and one or more edge servers.

The device 100 may receive path information regarding a device in which the first file is stored from the server 200 (S203), and may relay the path information to the first terminal (S204). The path information may include information indicating the device in which the first file is stored. That is, the path information may include information indicating the device in which the first file is stored, among one or more edge servers or the device 100. For example, the path information may include the network address of the device in which the first file is stored. The network address may include Internet Protocol (IP) address, for example. In the case that the first file is stored in the device 100, the path information may be information indicating the device 100. In the case that the first file is not stored in the device 100, the path information may be information indicating one or more other edge servers in which the first file is stored.

When the path information indicates that the first file is stored in the device 100, the first terminal may transmit information indicating transmission of the first file to the device 100 (S205). In an embodiment, the first terminal may transmit information indicating direct transmission of the first file to the device 100. As used herein, direct transmission may mean that the device 100 transmits the first file to the first terminal without going through other devices. In response to the request (S205) received from the first terminal, the device 100 may transmit the first file to the first terminal (S206). In this case, the device 100 may transmit the first file to the first terminal via a local network. In an embodiment, the device 100 may immediately transmit the first file to the first terminal after operation S203, without performing operations S204 and S205. In this case, the device 100 may transmit the first file to the first terminal, based on the path information received from the server 200.

In the above embodiment described with reference to FIG. 2, the device 100 may receive information indicating a request for transmission of the first file from the first terminal, and may receive path information regarding the device in which the first file is stored from the server 200.

When the path information indicates that the first file is stored in the device 100, the device 100 may transmit the first file to the first terminal via a local network, in response to the request received from the first terminal. Accordingly, the device 100 may receive a request for file transmission only from a limited number of one or more user terminals 400 connected via the local network. Therefore, relatively less traffic may occur in the device 100. In addition, the device 100 may identify demands for a specific file of the limited number of one or more user terminals 400 connected via the local network. The device 100 may store only files appropriate for the corresponding terminals, in view of the demands for the specific file of the one or more user terminals 400. That is, the device 100 needs to store only files which have been requested by the limited number of user terminals 400, or which have been transmitted to the user terminals 400, such that the device 100 can be implemented even with a memory having a small capacity, and may appropriately store files frequently used by the user terminals 400. Moreover, the device 100 transmits files over a short distance from the user terminals 400 via the local network, thereby increasing the file transmission speed.

Figure 3:
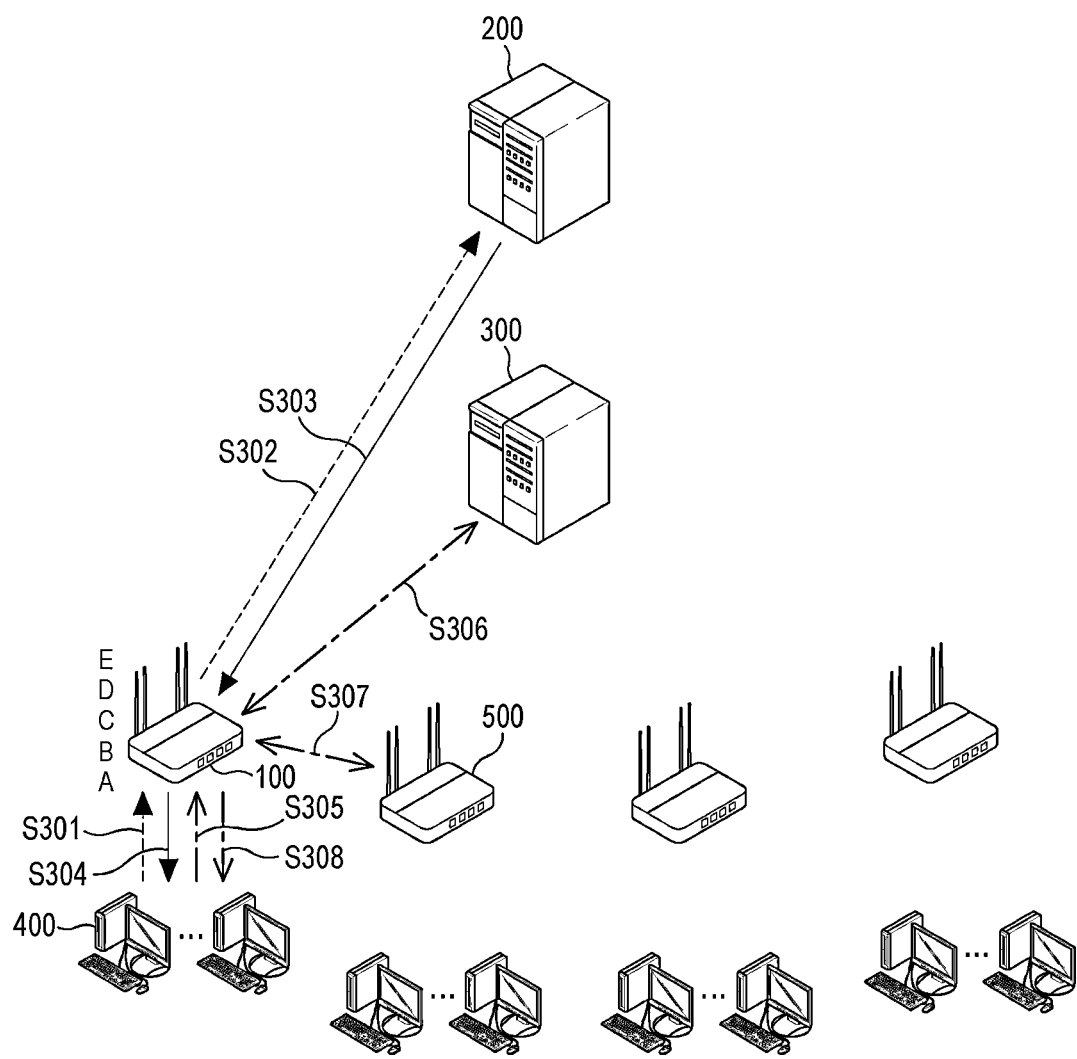
FIG. 3 illustrates a process of operations of a device according to an embodiment of the present disclosure.

FIG. 3 illustrates a process of operations of a device 100 according to an embodiment of the present disclosure. As described above, the device 100 may receive information indicating a request for transmission of a first file from a first terminal (S301), may transmit information indicating the request for transmission of the first file to a server 200 (S302), receive path information regarding a device in which the first file is stored from the server 200 (S303), and may relay the same to the first terminal (S304).

The path information may include information indicating that the first file is stored in an edge server 300, 500, or the like other than the device 100. In an embodiment, the server 200 may generate path information indicating an edge server 300, 500, or the like other than the device 100 and may transmit the same to the device 100 only in the case that the first file is not stored in the device 100. The path information may indicate an edge server 300 which is not directly connected to one or more user terminals via a local network, or may indicate an edge server 500 directly connected to one or more user terminals via a local network in the same or similar way as the device 100. However, the local network to which the edge server 500 is connected and the local network to which the device 100 is connected may be distinguishable from each other.

When the path information indicates that the first file is stored in edge servers 300 and 500 other than the device 100, the first terminal may send a request for transmission of the first file to one of the corresponding edge servers 300 and 500 via the device 100. That is, the first terminal may transmit information requesting transmission of the first file to the device 100 (S305). The device 100 may request one of the corresponding edge servers 300 and 500 to transmit the first file, in response to the request (S305) received from the first terminal, may receive the first file from one of the edge servers 300 and 500 (S306, S307), and may relay the same to the first terminal (S308). Accordingly, the first file may be transmitted to the first terminal even when the first file is not stored in the device 100.

In an embodiment, the path information may further include information indicating the priority of each of one or more edge servers 300 and 500 in which the first file is stored. The server 200 may determine the priority of each of the one or more edge servers 300 and 500, based on transmission speeds calculated according to a specific algorithm. The server 200 may include information indicating the determined priority in the path information.

In an embodiment, the device 100 may receive the first file from one of the corresponding edge servers 300 and 500, based on the priority of each of the one or more edge servers 300 and 500, at the request (S305) of the user terminal 400. Specifically, the device 100 may successively request the one or more edge servers 300 and 500 to transmit the first file, respectively, in descending order of priority, until the transmission of the first file is successfully completed. Accordingly, even when some of the one or more edge servers 300 and 500 cannot transmit the first file, the first file may be received from an edge server capable of transmitting the first file. In addition, based on the transmission speed of each of the edge servers 300 and 500, the first file may be received from the edge server capable of transmitting the first file most quickly.

In an embodiment, the device 100 may store the first file received from one of the one or more edge servers 300 and 500 in the memory 130. The first file, which has not been stored in the device 100, is accordingly stored in the device 100 such that, when retransmission of the first file is requested later, the device 100 may directly transmit the first file to the first terminal. The device 100 may transmit the first file to the first terminal via the local network, thereby performing fast file transmissiond.

Figure 4:
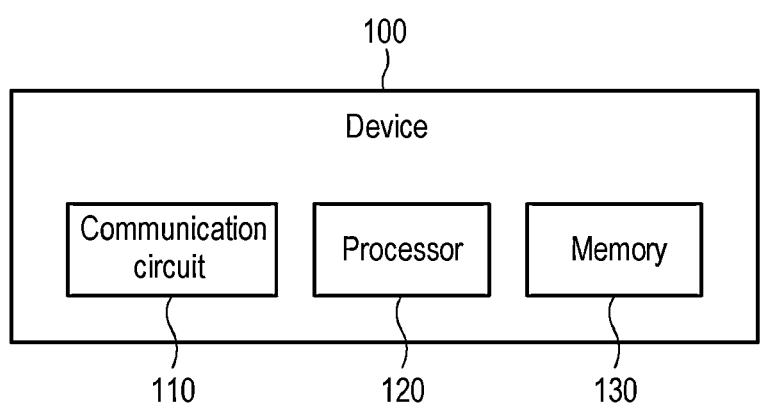
FIG. 4 is a block diagram of a device according to an embodiment of the present disclosure.

FIG. 4 is a block diagram of a device 100 according to an embodiment of the present disclosure. In an embodiment, the device 100 may include a communication circuit 110, one or more processors 120, and/or one or more memories 130 as components thereof. In an embodiment, at least one of the components of the device 100 may be omitted, or another component may be added to the device 100. In an embodiment, additionally or alternatively, some components may be implemented in an integrated manner, or may be implemented as a single entity or multiple entities. In the present disclosure, one or more processors 120 may be referred to as a processor 120. The expression, the processor 120 may denote a single processor or a set of more processors, unless otherwise described explicitly. In the present disclosure, one or more memories 130 may be referred to as a memory 130. The expression, the memory 130 may denote a single memory or a set of more memories, unless otherwise described explicitly. In an embodiment, at least some of internal and external components of the device 100 may be connected to each other via a bus, a general purpose input and output (GPIO), a serial peripheral interface (SPI), a mobile industry processor interface (MIPI), or the like, thereby exchanging information (data, signals, and the like).

The communication circuit 110 may communicate with a server 200 and one or more user terminals 400 on a local network. The communication circuit 110 may perform wired or wireless communication between the device 100 and at least one of the user terminals 400, the server 200, and edge servers 300 and 500. For example, the communication circuit 110 may perform wireless communication according to a scheme such as eMBB (enhanced Mobile Broadband), URLLC (Ultra Reliable Low-Latency Communications), MMTC (Massive Machine Type Communications), LTE (Long-Term Evolution), LTE-A (LTE Advance), NR (New Radio), UMTS (Universal Mobile Telecommunications System), GSM (Global System for Mobile Communications), CDMA (Code Division Multiple Access), WCDMA (Wideband CDMA), WiBro (Wireless Broadband), Wi-Fi (Wireless Fidelity), Bluetooth, NFC (Near Field Communication), GPS (Global Positioning System), or GNSS (Global Navigation Satellite System). For example, the communication circuit 110 may perform wired communication according to a scheme such as USB (Universal Serial Bus), HDMI (High Definition Multimedia Interface), RS-232 (Recommended Standard-232), or POTS (Plain Old Telephone Service). In an embodiment, the device 100 may be implemented to be integrated with another device. In this case, the communication circuit 110 may function as an access circuit or an interface for connecting the device 100 and the other device.

The processor 120 may execute software (for example, command, program, or the like) so as to control at least one component of the device 100 connected to the processor 120. In addition, the processor 120 may perform operations such as various calculations, processing, data generation, and modification related to the present disclosure. In addition, the processor 120 may load data or the like from the memory 130 or may store the same in the memory 130. In an embodiment, the processor 120 may control the communication circuit 110 so as to receive information indicating a first file from a first terminal among one or more user terminals 400 connected via a local network, to transmit the same to the server 200, to receive path information regarding a device in which the first file is stored from the server 200, to transmit the same to the first terminal, and to transmit the first file to the first terminal via the local network in response to a request of the first terminal.

The memory 130 may store various information (data). Information stored in the memory 130 is information acquired, processed, or used by at least one component of the device 100, and may include software (for example, command, program, or the like). The memory 130 may include a volatile memory and/or a nonvolatile memory. In the present disclosure, the command or program refers to software stored in the memory 130, and may include an operating system for controlling resources of the device 100, an application, and/or middleware for providing various functions to the application such that the application can utilize resources of the device 100. In an embodiment, the memory 130 may store commands that cause the processor 120 to perform calculations when executed by the processor 120. The memory 130 may store at least some of files transmitted to one or more user terminals 400 via the communication circuit 110. The processor 120 may store at least some of files transmitted to one of one or more user terminals 400 via the communication circuit 110 in the memory 130.

Figure 5:
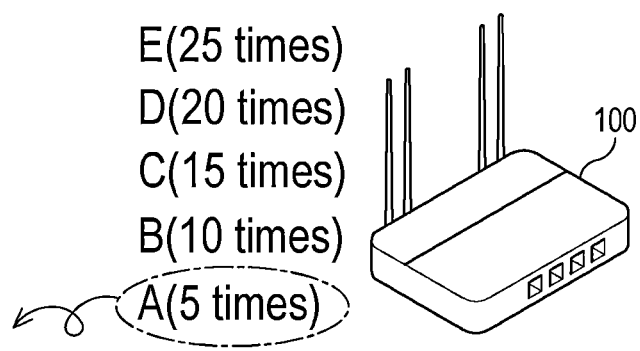
FIG. 5 illustrates a process of operations in which a device according to an embodiment of the present disclosure deletes at least some files.

FIG. 5 illustrates a process of operations in which a device 100 according to an embodiment of the present disclosure deletes at least some files.

In an embodiment, a processor 120 may determine priority based on the number of times each file has been transmitted to one or more user terminals 400. The processor 120 may delete at least some of the files according to the determined priority. In an embodiment, the processor 120 may delete at least some of stored files at a timepoint at which at least some of the files stored in the memory 130 need to be deleted. For example, the processor 120 may delete a single file having the smallest number of transmissions to one or more user terminals 400 or may delete two or more files in ascending order of the number of transmissions to the one or more user terminals 400. For example, it will be assumed that files A, B, C, D, and E stored in the memory 130 have been transmitted to one or more user terminals 400 5 times, 10 times, 15 times, 20 times, and 25 times, respectively. In this case, the processor 120 may delete file A, which has the smallest number of transmissions to the one or more user terminals 400 among the files stored in the memory 130, from the memory 130, or may delete two or more files from the memory 130 in ascending order of the number of transmissions to the one or more user terminals 400 (in the order of A, B, C, D, and E).

In an embodiment, when there are files having the same number of transmissions to the one or more user terminals 400, the processor 120 may arbitrarily determine priority with regard to the files having the same number of transmissions to the one or more user terminals 400, or may determine priority based on the file size. Specifically, according to a configured reference, the larger the file size, the higher priority, or the smaller the file size, the higher priority. For example, it may be assumed that files A, B, C, D, and E stored in the memory 130 have been transmitted to one or more user terminals 400 5 times, 5 times, 5 times, 10 times, and 15 times, respectively, and files A, B, C, D, and E have file sizes of 50 Mb, 100 Mb, 150 Mb, 100 Mb, and 100 Mb, respectively. In this case, the processor 120 may assign higher priority to files A, B, and C, which have the smallest number of transmissions to the one or more user terminals 400 among the files stored in the memory 130, than files D and E. The processor 120 may arbitrarily determine priority with regard to files A, B, and C, which have the smallest number of transmissions to the one or more user terminals 400, may assign high priority in descending order of file size (in the order of C, B, and A), or may assign high priority in ascending order of file size (in the order of A, B, and C). In another embodiment, the processor 120 may delete at least some of the files according to priority based on a first-in first-out (FIFO) scheme.

In an embodiment, the processor 120 may delete one or more files, the number of transmissions of which to one or more user terminals 400 is less than a preset reference value, all from the memory 130 at a timepoint at which at least some of the stored files need to be deleted. For example, it will be assumed that files A, B, C, D, and E stored in the memory 130 have been transmitted to one or more user terminals 400 5 times, 10 times, 15 times, 20 times, and 25 times, respectively, and the preset reference value is 20 times. In this case, the processor 120 may delete files A, B, and C, the number of transmissions of which to one or more user terminals 400 is less than the preset reference value (20 times) among the files stored in the memory 130, from the memory 130. Accordingly, specific files having a high amount of demand may be prevented from being deleted, and files having a low amount of demand may be deleted on a priority basis. The processor 120 may store information regarding the number of times each file has been transmitted to one or more user terminals 400 in the memory 130. In an embodiment, each time a file is transmitted to one of the one or more user terminals 400, the processor 120 may update the number of times the corresponding file has been transmitted to the one or more user terminals 400. In an embodiment, the number of times each file has been transmitted to the one or more user terminals 400 may be the accumulated number of times each file has been transmitted to the one or more user terminals 400, or the number of times each file has been transmitted to the one or more user terminals 400 within a preset specific period of time.

In an embodiment, the processor 120 may delete at least some of files stored in the memory 130, based on the storage space of the memory 130. In an embodiment, when the storage space of the memory 130 becomes insufficient, or when the storage space of the memory 130 is being used beyond a preset threshold, the processor 120 may delete at least some of files stored in the memory 130. Accordingly, the available storage space of the memory 130 may be secured. In another embodiment, the processor 120 may periodically delete at least some of files stored in the memory 130 according to a preset period.

In an embodiment, the processor 120 may delete at least some of files stored in the memory 130, based on the number of user terminals to which each file has been transmitted. Specifically, the processor 120 may determine the number of user terminals to which each file has been transmitted, based on information indicating the file transmission history of each of one or more user terminals 400. In an embodiment, with regard to each of the files stored in the memory 130, the processor 120 may delete a single file having the smallest number of user terminals to which the same has been transmitted, or may delete two or more files in ascending order of the number of user terminals to which the same have been transmitted. For example, it will be assumed that the number of user terminals to which files A, B, C, D, and E are stored in the memory 130 have been transmitted is 5, 10, 15, 20, and 25, respectively. In this case, the processor 120 may delete file A having the smallest number of user terminals to which the same has been transmitted, among the file stored in the memory 130, from the memory 130, or may delete two or more files in ascending order of the number of user terminals to which transmissions have been made (in the order of A, B, C, D, and E), from the memory 130. In an embodiment, the processor 120 may delete one or more files transmitted to user terminals, the number of which is less than a preset reference value, all from the memory 130 at a timepoint at which at least some of the stored files need to be deleted. For example, it will be assumed that the number of user terminals to which files A, B, C, D, and E stored in the memory 130 have been transmitted is 5, 10, 15, 20, and 25, respectively, and the preset reference value is 15. In this case, the processor 120 may delete files A and B transmitted to user terminals, the number of which is less than the preset reference value (15) among the files stored in the memory 130, from the memory 130. Accordingly, repeated transmissions to a single user terminal are counted as one transmission such that, even when the user has the corresponding file retransmitted without being aware that he/she already has the same, or when the same is repeatedly transmitted by mistake, the corresponding file is not regarded as having a high amount of demand and thus is not immune to deletion.

Figure 6:
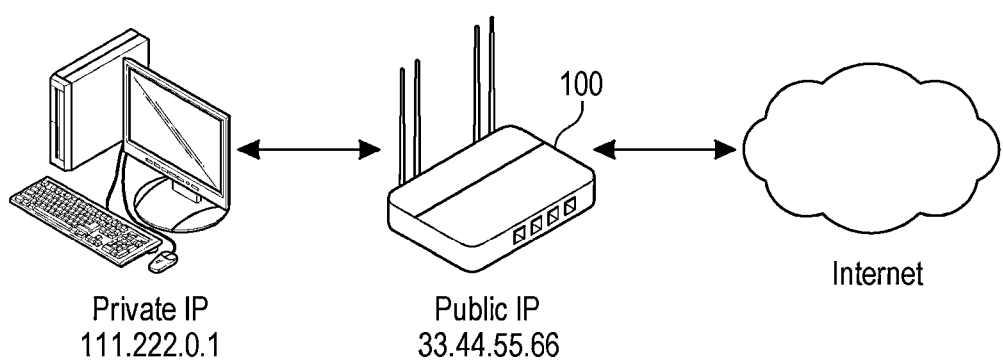
FIG. 6 illustrates a process of operations of a device according to an embodiment of the present disclosure.

FIG. 6 illustrates address conversion information according to an embodiment of the present disclosure. The address conversion information may include network addresses before and after conversion of each of terminals (that is, one or more user terminals 400), the network address of which has been converted via a device 100. That is, the address conversion information may include information indicating a correspondence between the network address of one or more user terminals 400 on a local network and the network address of the device 100 on a wide-area network for accessing a server 200. In an embodiment, the network for accessing the server 200 may be the Internet. In an embodiment, the network address may be Internet Protocol (IP) address or Media Access Control (MAC) address. In an embodiment, the address conversion information may be network address translation (NAT) information. However, the address conversion information is not limited to NAT information.

In an embodiment, the address conversion information may include information for converting a private IP address of one or more user terminals 400 to a public IP address of the device 100 and/or information for inversely converting the same. For example, the address conversion information may include information (for example, conversion table) for converting a private IP address of a user terminal (111.222.0.1) to a public IP address of the device 100 (33.44.55.66). In an embodiment, the address conversion information may include information for converting a MAC address corresponding to a user terminal to a public IP address of the device 100, information for converting a MAC address corresponding to a user terminal to a MAC address of the device 100, or information for converting a private IP address of a user terminal to a MAC address of the device 100.

In an embodiment, the address conversion information may include information indicating a history of each of one or more user terminals 400 having converted the network address via the device 100 and/or a history of the device 100 having transmitted a file to each of the one or more user terminals 400 (hereinafter, referred to as history information).

As described above, the processor 120 of the device 100 may delete at least some of the files stored in the memory 130. In this case, the processor 120 may determine files to delete, among the files stored in the memory 130, based on address conversion information. In an embodiment, the processor 120 may determine one or more user terminals (hereinafter, referred to as second terminals) having high network address conversion frequencies among one or more user terminals, and may determine which of the files are to be deleted, based on the number of times each file has been transmitted to the one or more second terminals. There may be a high probability that the second terminals having high network address conversion frequencies will request the same file. For example, when a local network connecting a device 100 and a user terminal 400 is a network used at a company, terminals used by workers in the company may be determined as the second terminals having high network address conversion frequencies. There may be a high probability that the second terminals of the workers may request the same file used for work in the company network. As another example, when a local network connecting a device 100 and a user terminal 400 is a network used at a school, terminals used by students in the school may be determined as the second terminals having high network address conversion frequencies. There may be a high probability that the second terminals of the students may request the same file used for schoolwork in the school network. Therefore, the device 100 may not delete but keep storing files transmitted to user terminals determined as second terminals a large number of times, thereby increasing the probability that a file requested by one or more user terminals will be stored in the device 100. That is, the device 100 may determine files to delete or store in view of the demand of user terminals determined as second terminals, thereby increasing the caching efficiency.

In an embodiment, the processor 120 may determine, based on address conversion information, that user terminals that have converted network addresses with frequencies higher than a preset first reference are one or more second terminals. The processor 120 may identify or distinguish each of one or more user terminals 400, based on the local network address of each of one or more user terminals 400 included in the address conversion information. The processor 120 may determine the frequency with which each of the one or more user terminals 400 has converted network addresses via the device 100, based on history information of address conversion information. In an embodiment, the processor 120 may determine the frequency with which each of the one or more user terminals 400 has converted network addresses, based on the number of times each of the one or more user terminals 400 has converted network addresses for a preset period of time. In an embodiment, the processor 120 may determine the frequency with which each of the one or more user terminals 400 has converted network addresses, based on the number of times each of the one or more user terminals 400 has converted network addresses from the timepoint of initial network address conversion to the present time.

In an embodiment, the processor 120 may determine, based on the address conversion information, that user terminals that have converted network addresses with frequencies lower than a preset second reference, among one or more second terminals, are one or more third terminals. In addition, the processor 120 may determine files to delete by assigning the number of times each file has been transmitted to one or more third terminals a weight lower than that given to the number of transmissions to remaining second terminals. In an embodiment, the above-mentioned first reference may indicate a frequency lower than the second reference. For example, provided that the first reference indicates, as a reference value of frequency, that network address conversion occurs 10 times or more per month, the second reference may indicate, as a reference value of frequency, that network address conversion occurs 15 times or more per month. Specifically, the processor 120 may apply a weight smaller than 1 to the number of times each file stored in the memory 130 has been transmitted to one or more third terminals. For example, the weight smaller than 1 may be 0 or a preset value between 0 and 1. Third terminals having low amount of network address conversions, among the second terminals, may be terminals that go through the device 100, when accessing a network outside the local network, with relatively low frequencies. Files may be transmitted to such third terminals via the device 100 with low frequencies in the future, and files mainly requested by the third terminals may have less transmission demands in the future. Therefore, a low weight may be assigned to file requests from the third terminals such that the same are to be pre-stored in the device 100 with low priority, thereby utilizing the storage space of the device 100 more efficiently.

As described above, the processor 120 may determine at least some files to delete among the files stored in the memory 130, based on the number of times each file has been transmitted to one or more second terminals. In an embodiment, the processor 120 may delete a single file having the smallest number of transmissions to one or more second terminals, among the files stored in the memory 130, or may delete two or more files in ascending order of the number of transmissions to one or more second terminals. In an embodiment, when there are files having the same number of transmissions to one or more second terminals, the processor 120 may determine files to delete by arbitrarily determining priority with regard to the files having the same number of transmissions to one or more second terminals. For example, the processor 120 may determine the corresponding priority based on file sizes. For example, it will be assumed that the number of times each of files A, B, C, D, and E stored in the memory 130 has been transmitted to one or more second terminals is 5, 5, 5, 10, and 15, respectively, and the file size of each of the files A, B, C, D, and E is 50 Mb, 100 Mb, 150 Mb, 100 Mb, and 100 Mb, respectively. In this case, the processor 120 may assign higher priority to files A, B and C, which have the smallest number of transmissions to one or more second terminals among the files stored in the memory 130, than files D and E. The processor 120 may arbitrarily determine priority with regard to the files A, B and C having have the same number of transmissions to one or more second terminals, may assign high priority in descending order of file size (in the order of C, B, and A), or may assign high priority in ascending order of file size (in the order of A, B, and C). In an embodiment, the processor 120 may delete one or more files, the number of transmissions of which to one or more second terminals is less than a preset reference value, all from the memory 130 at a timepoint at which at least some of the stored files need to be deleted. For example, it will be assumed that files A, B, C, D, and E stored in the memory 130 have been transmitted to one or more second terminals 5 times, 10 times, 15 times, 20 times, and 25 times, respectively, and the preset reference value is 20 times. In this case, the processor 120 may delete files A, B, and C, the number of transmissions of which to one or more second terminals is less than the preset reference value (20 times) among the files stored in the memory 130, from the memory 130. Accordingly, the storage space of the device 100 may be secured by deleting files having a low amount of transmission demands from the memory 130.

Figure 7:
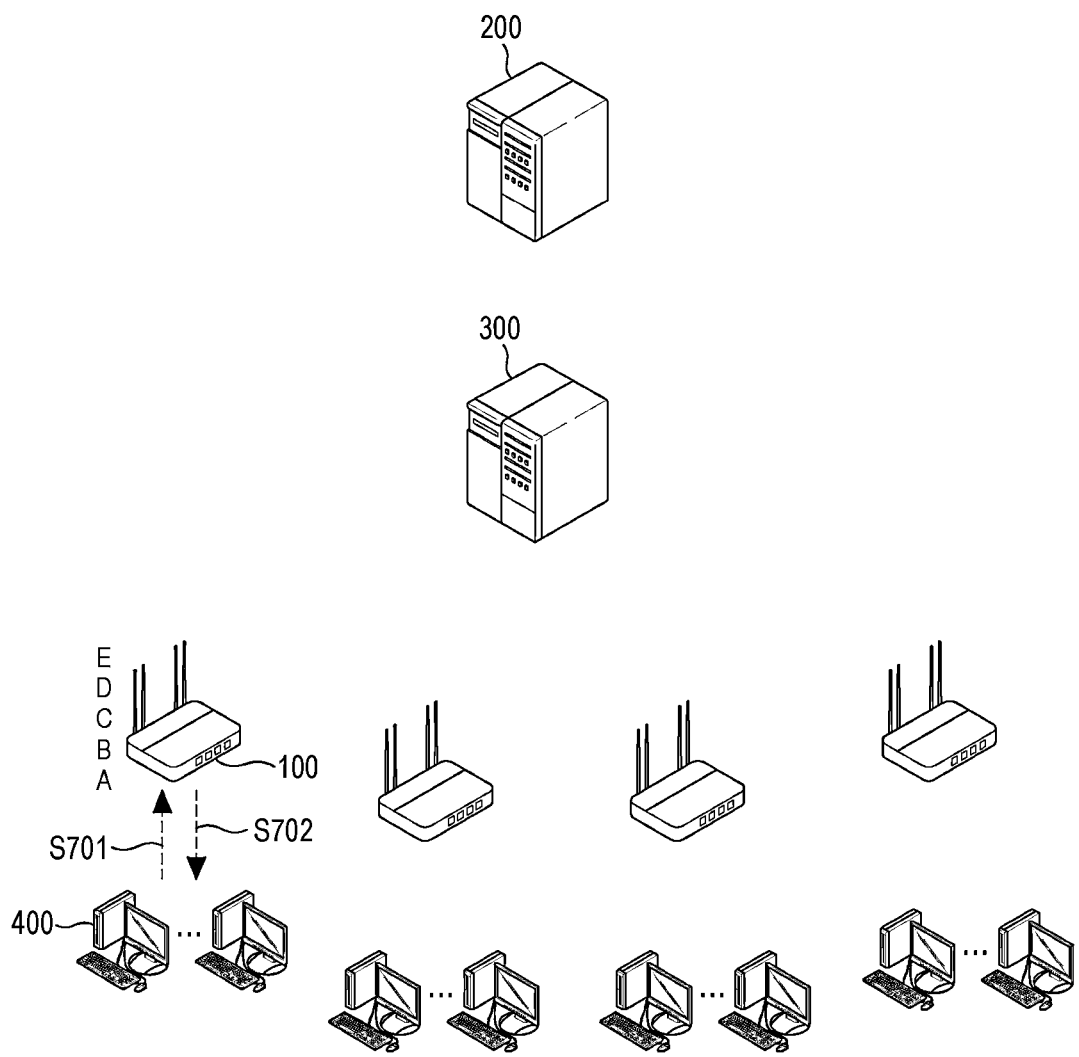
FIG. 7 illustrates a process of operations of a device according to an embodiment of the present disclosure.

FIG. 7 illustrates a process of operations of a device 100 according to an embodiment of the present disclosure. The device 100 may receive information indicating a first file transmission request from a first terminal among one or more user terminals 400 (S701). In an embodiment, in response to the transmission request received from the first terminal, the device 100 may independently determine whether the first file is stored in one or more memories 130, and may transmit the first file to the first terminal in accordance with determining that the first file is stored therein (S702). In an embodiment, the device 100 may transmit the first file to the first terminal without an operation of communicating with a server 200 when the first file is stored therein. In an embodiment, the device 100 may identify the identifier of the first file by interpreting the information or packet indicating the first file transmission request received from the first terminal. The device 100 may determine whether the first file is stored in a memory 130, based on the identified identifier of the first file. In this case, the device 100 may further include a software or hardware module for interpreting the information or packet indicating the first file transmission request received from the first terminal. Accordingly, when the device 100 has the first file stored therein, traffic occurring in the server 200 may be reduced.

Figure 8:
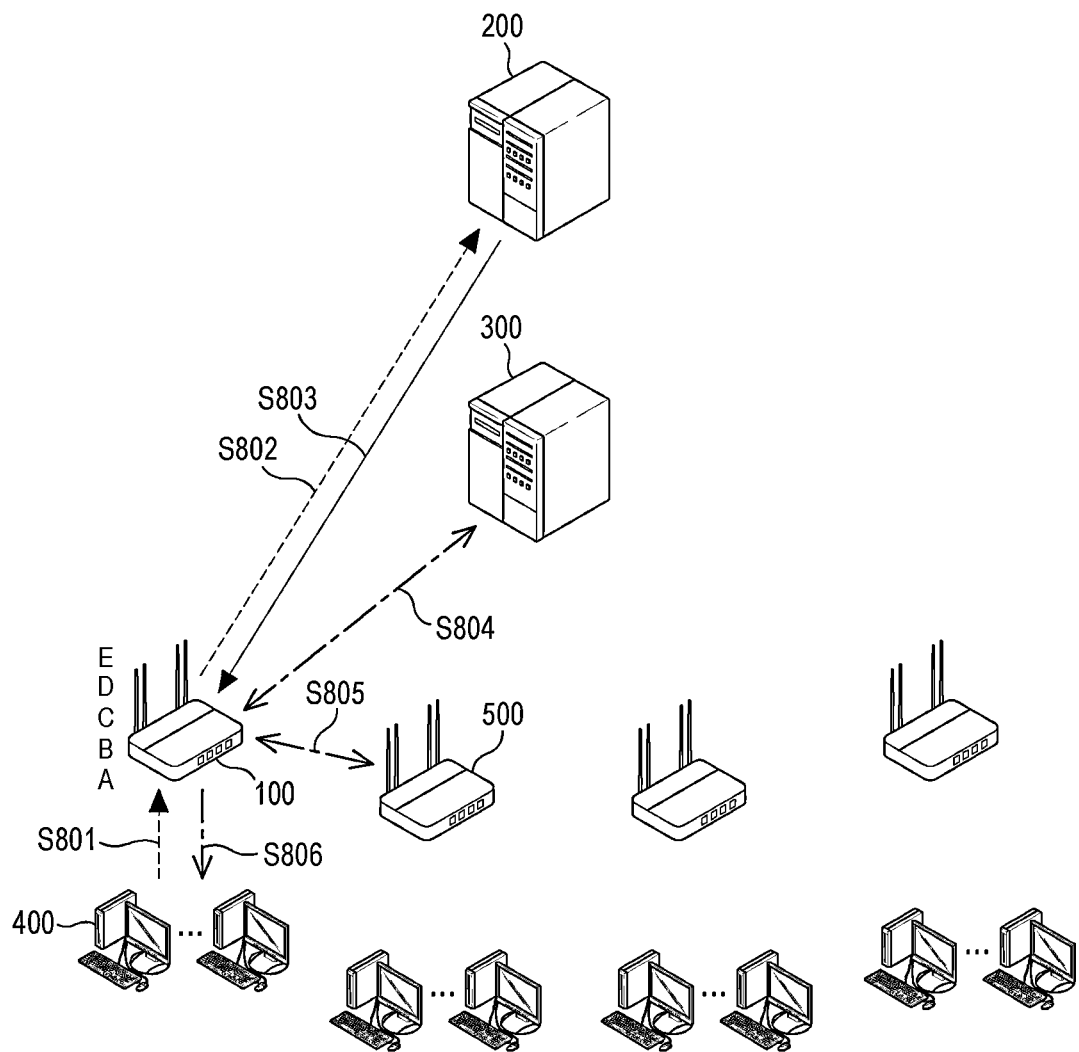
FIG. 8 illustrates address conversion information according to an embodiment of the present disclosure.

FIG. 8 illustrates a process of operations of a device 100 according to an embodiment of the present disclosure. The device 100 may receive information indicating a first file transmission request from a first terminal among one or more user terminals 400 (S801). In an embodiment, the device 100 may independently determine whether the first file is stored in one or more memories 130, may transmit the information indicating a first file transmission request to a server 200 in accordance with determining that that the first file is not stored therein (S802), and may receive path information regarding a device in which the first file is stored from the server 200 (S803). The path information may include information indicating one or more edge servers 300 and 500 in which the first file is stored. In response to the path information received from the server 200, the device 100 may request one or more other edge servers 300 and 500 to transmit the first file (S804, S805), may receive the first file from one or more other edge servers 300 and 500 (S804, S805), and may transmit the same to the first terminal (S806). Accordingly, operations for transmitting path information regarding the device in which the first file is stored, between the device 100 and the first terminal, are omitted, thereby reducing the traffic occurring between the device 100 and the first terminal.

FIG. 9 is a flowchart illustrating a method according to an embodiment of the present disclosure. The method 900 according to an embodiment may include an operation (S910) in which a device 100 configured to communicate with a server 200 and one or more user terminals 400 on a local network receives information indicating a first file from a first terminal among the one or more user terminals 400 and transmits the same to the server 200; an operation (S920) in which the device 100 received path information regarding a device in which the first file is stored from the server 200 and transmitting the same to the first terminal; and an operation (S930) in which the device 100, in response to a request from the first terminal, transmits the first file to the first terminal via the local network.

In an embodiment, operation S930 may include an operation in which the device 100, in response to the request from the first terminal, receives the first file from one of one or more edge servers 300 and 500, and an operation in which the device 100 transmits the first file to the first terminal.

In an embodiment, the operation in which the device 100 receives the first file from one of one or more edge servers 300 and 500 may include an operation of storing the first file received from one of the one or more edge servers 300 and 500 in one or more memories 130.

In an embodiment, operation S930 may include an operation in which the device 100, in response to the request from the first terminal, receives the first file from one of one or more edge servers 300 and 500, based on the priority of each of the one or more edge servers 300 and 500.

In an embodiment, the method 900 may further include an operation in which the device 100 deletes at least some of files stored in a memory 130, based on the number of times each file has been transmitted to one or more user terminals 400.

In an embodiment, the operation in which the device 100 deletes at least some of files stored in the memory 130, based on the number of times each file stored in the memory 130 has been transmitted to one or more user terminals 400, may include an operation of deleting at least some of the files stored in the memories 130, based on the storage space of the one or more memories 130.

In an embodiment, the operation of deleting at least some of the files stored in the memories 130, based on the storage space of the one or more memories 130, may include an operation of deleting at least some of the files at a timepoint at which the storage space of the one or more memories becomes insufficient, or at which the storage space of the one or more memories in use exceeds a preset threshold.

In an embodiment, the operation in which the device 100 deletes at least some of the files stored in the memories 130, based on the number of times each file stored in the memories 130 has been transmitted to one or more user terminals 400, may include an operation of periodically deleting at least some of the files according to a preset period.

In an embodiment, the operation in which the device 100 deletes at least some of the files stored in the memories 130, based on the number of times each file stored in the memories 130 has been transmitted to one or more user terminals 400, may include an operation of determining one or more second terminals among one or more user terminals 400, based on address conversion information, and an operation of deleting at least some of the files stored in the memories 130, based on the number of times each file stored in the memory 130 has been transmitted to the one or more second terminals.

In an embodiment, the operation of determining one or more second terminals among one or more user terminals 400, based on address conversion information, may include an operation of determining, based on the address conversion information, that user terminals that have converted network addresses with frequencies higher than a preset first reference, among the one or more user terminals, are the one or more second terminals.

In an embodiment, the operation in which the device 100 deletes at least some of the files, based on the number of times each file has been transmitted to one or more user terminals 400, may further include an operation of determining, based on address conversion information, that user terminals that have converted network addresses with frequencies below a preset second reference, among the one or more second terminals, are one or more third terminals, and an operation of applying a weight smaller than 1 to the number of times each file stored in the memories 130 has been transmitted to the one or more third terminals. In an embodiment, the operation of deleting at least some of the files stored in the memories 130, based on the number of times each file stored in the memories 130 has been transmitted to one or more second terminals, may include an operation of deleting at least some of the files stored in the memories 130, based on adjusted transmission numbers and the number of times each file stored in the memories 130 has been transmitted to one or more second terminals.

In an embodiment, the method 900 may further include an operation in which the device 100 deletes at least some of the files stored in the memories 130, based on the number of user terminals to which each file stored in the memories 130 has been transmitted.

Methods according to the present disclosure may be methods implemented by a computer. Although respective operations of the corresponding methods have been illustrated and described in a specific order in the present disclosure, respective operations may not only be performed successively, but also be performed in an any combinable order according to the present disclosure. In an embodiment, at least some operations may be performed in a parallel, repetitively, or heuristic manner. The present disclosure does not exclude changes or modifications to the corresponding methods. In an embodiment, at least some operations may be omitted, or other operations may be added.

Various embodiments of the present disclosure may be implemented as software recorded in a machine-readable recording medium which can be read by a machine. The software may be software for implementing various embodiments of the present disclosure described above. The software may be inferred from various embodiments of the present disclosure by programmers in the art to which the present disclosure pertains. For example, the software may be a machine-readable command (for example, code or code segment) or program. The machine refers to a device capable of operating according to a command retrieved from a recording medium, and may be a computer, for example. In an embodiment, the machine may be the device 100 according to embodiments of the present disclosure. In an embodiment, the processor of the machine may execute a retrieved command such that components of the device perform a function corresponding to the command. In an embodiment, the processor may be the processor 120 according to embodiments of the present disclosure. The recording medium may refer to any kind of recording medium which can be read by a machine, and in which data is stored. Examples of the recording medium may include ROM, RAM, CD-ROM, magnetic tape, floppy disk, optical data storage device and the like. In an embodiment, the recording medium may be memories 130. In an embodiment, the recording medium may be implemented to be distributed to computer systems or the like, which are connected via a network. The software may be distributed and stored in computer systems or the like, and then executed. The recording medium may be a non-transitory recording medium. The non-transitory recording medium refers to a tangible medium which exists regardless of whether data is stored semi-permanently or temporarily, and does not include a signal that is transmitted in a transitory manner.

Although the technical spirit of the present disclosure has been described by various embodiments, the technical spirit of the present disclosure includes various substitutions, modifications, and changes which can be made in the scope of which can be understood by those skilled in the art to which the present disclosure pertains. In addition, it should be noted that that such substitutions, modifications, and changes are intended to fall within the scope of the appended claims. Embodiments according to the present disclosure may be combined with each other. Respective embodiments may be variously combined according to the number of cases, and embodiments obtained by combinations also fall within the scope of the present disclosure.

Hereinafter, various embodiments of the present disclosure will be described additionally.

[Additional description 1] A device including: a communication circuit configured to communicate with a server and one or more user terminals on a local network; one or more processors; and one or more memories configured to store files transmitted to the one or more user terminals via the communication circuit, wherein the one or more processors, by controlling the communication circuit, are configured to: receive information indicating a first file from a first terminal among the one or more user terminals and transmit the information to the server, receive path information regarding a device in which the first file is stored from the server and transmit the path information to the first terminal, and transmit the first file to the first terminal via the local network, in response to a request from the first terminal.

[Additional description 2] The device of additional description 1, wherein the path information includes information indicating one or more edge servers in which the first file is stored, and wherein the one or more processors are configured to: receive the first file from one of the one or more edge servers, in response to the request from the first terminal, and transmit the first file to the first terminal.

[Additional description 3] The device of additional description 2, wherein the path information further includes information indicating priority of each of the one or more edge servers, and wherein the one or more processors are configured to receive the first file from one of the one or more edge servers based on the priority, in response to the request from the first terminal.

[Additional description 4] The device of one of additional descriptions 2 and 3, wherein the one or more processors are configured to store the first file received from one of the one or more edge servers in the one or more memories.

[Additional description 5] The device of one of additional descriptions 1 to 4, wherein the one or more processors are configured to delete at least some of the files, based on a number of times each of the files has been transmitted to the one or more user terminals.

[Additional description 6] The device of additional description 5, wherein the one or more processors are configured to delete the at least some of the files, based on a storage space of the one or more memories.

[Additional description 7] The device of additional description 6, wherein the one or more processors are configured to delete the at least some of the files at a timepoint at which the storage space of the one or more memories becomes insufficient, or at which the storage space of the one or more memories in use exceeds a preset threshold.

[Additional description 8] The device of one of additional descriptions 5 to 7, wherein the one or more processors are configured to periodically delete at least some of the files according to a preset period.

[Additional description 9] The device of one of additional descriptions 5 to 8, wherein the one or memories are configured to further store address conversion information for converting a network address of the one or more user terminals on the local network to a network address for accessing the server, and wherein the one or more processors are configured to: determine one or more second terminals among the one or more user terminals, based on the address conversion information, and delete the at least some of the files, based on a number of times each of the files has been transmitted to the one or more second terminals.

[Additional description 10] The device of additional description 9, wherein the one or more processors are configured to determine, based on the address conversion information, as the one or more second terminals, user terminals that have converted network addresses with a frequency higher than a preset first reference, among the one or more user terminals.

[Additional description 11] The device of additional description 10, wherein the one or more processors are configured to: determine, based on the address conversion information, as one or more third terminals, user terminals that have converted network addresses with a frequency lower than a preset second reference, among the one or more second terminals, and apply a weight smaller than 1 to a number of times each of the files has been transmitted to the one or more third terminals.

[Additional description 12] The device of additional description 11, wherein the first reference indicates a frequency lower than the second reference.

[Additional description 13] The device of one of additional descriptions 9 to 12, wherein the address conversion information includes an Internet Protocol (IP) address or a Media Access Control (MAC) address of each of the one or more user terminals.

[Additional description 14] The device of one of additional descriptions 9 to 13, wherein the address conversion information is network address translation (NAT) information.

[Additional description 15] The device of one of additional descriptions 1 to 14, wherein the one or more processors are configured to delete at least some of the files, based on a number of user terminals to which each of the files has been transmitted.

[Additional description 16] The device of one of additional descriptions 1 to 15, wherein the one or more processors are configured to: determine whether the first file is stored in the one or more memories, and transmit the first file to the first terminal in accordance with determining that that the first file is stored.

[Additional description 17] The device of one of additional descriptions 1 to 16, wherein the device is an access point, a router, or a sharing device.

[Additional description 18] The device of one of additional descriptions 1 to 17, wherein the local network includes Wireless Fidelity (Wi-Fi) or a local area network (LAN).

[Additional description 19] A method including: receiving, by a device configured to communicate with a server and one or more user terminals on a local network, information indicating a first file from a first terminal among the one or more user terminals and transmitting the information to the server; receiving, by the device, path information regarding a device in which the first file is stored from the server and transmitting the path information to the first terminal; and transmitting, by the device, the first file to the first terminal via the local network, in response to a request from the first terminal.

[Additional description 20] A non-transitory computer-readable recording medium recording a program to be executed on a computer, wherein the program comprises executable commands, when executed by one or more processors, causing the one or more processors to: receive information indicating a first file from a first terminal among one or more user terminals on a local network and transmit the information to a server; receive path information regarding a device in which the first file is stored from the server and transmit the path information to the first terminal; and transmit the first file to the first terminal via the local network, in response to a request from the first terminal.

What is claimed is:
1. A device comprising:
a communication circuit configured to communicate with a server and one or more user terminals on a local network;
one or more processors; and
one or more memories configured to store files transmitted to the one or more user terminals via the communication circuit,
wherein the one or more processors, by controlling the communication circuit, are configured to:
receive information indicating a first file from a first terminal among the one or more user terminals and transmit the information to the server,
receive path information regarding a device in which the first file is stored from the server and transmit the path information to the first terminal,
transmit the first file to the first terminal via the local network, in response to a request from the first terminal; and
delete at least one of the files, based on at least one of:
a number of times each of the files has been transmitted to the one or more user terminals, or
a number of the user terminals to which each of the files has been transmitted.
2. The device of claim 1, wherein the path information comprises information indicating one or more edge servers in which the first file is stored, and
wherein the one or more processors are configured to:
receive the first file from one of the one or more edge servers, in response to the request from the first terminal, and
transmit the first file to the first terminal.
3. The device of claim 2, wherein the path information further comprises information indicating priority of each of the one or more edge servers, and wherein the one or more processors are configured to receive the first file from one of the one or more edge servers based on the priority, in response to the request from the first terminal.

4. The device of claim 2, wherein the one or more processors are configured to store the first file received from one of the one or more edge servers in the one or more memories.

5. The device of claim 1, wherein the one or more processors are configured to delete the at least some of the files, based on a storage space of the one or more memories.

6. The device of claim 5, wherein the one or more processors are configured to delete the at least some of the files at a timepoint at which the storage space of the one or more memories becomes insufficient, or at which the storage space of the one or more memories in use exceeds a preset threshold.

7. The device of claim 1, wherein the one or more processors are configured to periodically delete at least some of the files according to a preset period.

8. The device of claim 1, wherein the one or memories are configured to further store address conversion information for converting a network address of the one or more user terminals on the local network to a network address for accessing the server, and
wherein the one or more processors are configured to:
determine one or more second terminals among the one or more user terminals, based on the address conversion information, and
delete the at least some of the files, based on a number of times each of the files has been transmitted to the one or more second terminals.

9. The device of claim 8, wherein the one or more processors are configured to determine, based on the address conversion information, as the one or more second terminals, user terminals that have converted network addresses with a frequency higher than a preset first reference, among the one or more user terminals.

10. The device of claim 9, wherein the one or more processors are configured to:
determine, based on the address conversion information, as one or more third terminals, user terminals that have converted network addresses with a frequency lower than a preset second reference, among the one or more second terminals, and
apply a weight smaller than 1 to a number of times each of the files has been transmitted to the one or more third terminals.

11. The device of claim 10, wherein the first reference indicates a frequency lower than the second reference.

12. The device of claim 8, wherein the address conversion information includes an Internet Protocol (IP) address or a Media Access Control (MAC) address of each of the one or more user terminals.

13. The device of claim 8, wherein the address conversion information is network address translation (NAT) information.

14. The device of claim 1, wherein the one or more processors are configured to:
determine whether the first file is stored in the one or more memories, and
transmit the first file to the first terminal in accordance with determining that the first file is stored.

15. The device of claim 1, wherein the device is an access point, a router, or a sharing device.

16. The device of claim 1, wherein the local network includes Wireless Fidelity (Wi-Fi) or a local area network (LAN).

17. A method comprising:
receiving, by a device configured to communicate with a server and one or more user terminals on a local network and store files transmitted to the one or more user terminals, information indicating a first file from a first terminal among the one or more user terminals and transmitting the information to the server;
receiving, by the device, path information regarding a device in which the first file is stored from the server and transmitting the path information to the first terminal;
transmitting, by the device, the first file to the first terminal via the local network, in response to a request from the first terminal; and
deleting at least one of the files, based on at least one of:
a number of times each of the files has been transmitted to the one or more user terminals, or
a number of the user terminals to which each of the files has been transmitted.

18. A non-transitory computer-readable recording medium recording a program to be executed on a computer, wherein the program comprises executable commands, when executed by one or more processors, causing the one or more processors to:
receive information indicating a first file from a first terminal among one or more user terminals on a local network and transmit the information to a server;
receive path information regarding a device in which the first file is stored from the server and transmit the path information to the first terminal;
transmit the first file to the first terminal via the local network, in response to a request from the first terminal; and
delete at least one of the files, based on at least one of:
a number of times each of the files has been transmitted to the one or more user terminals, or
a number of the user terminals to which each of the files has been transmitted.

* * * * *